July 20, 1965  J. M. MORRIS ETAL  3,195,713
VIBRATORY CONVEYOR WITH SHINGLED DECK
Filed May 24, 1961  4 Sheets-Sheet 1
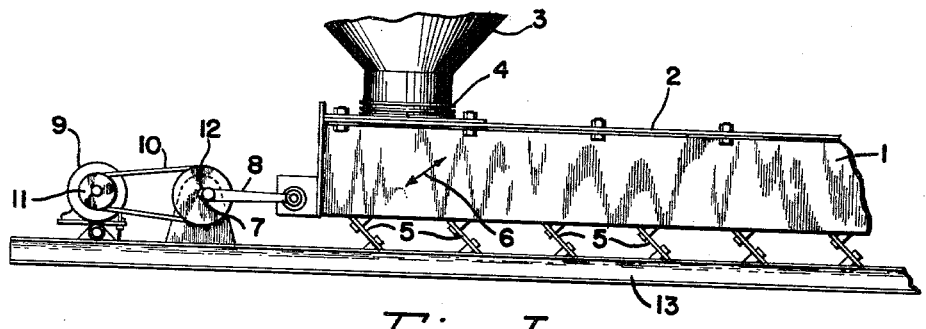
Fig. I
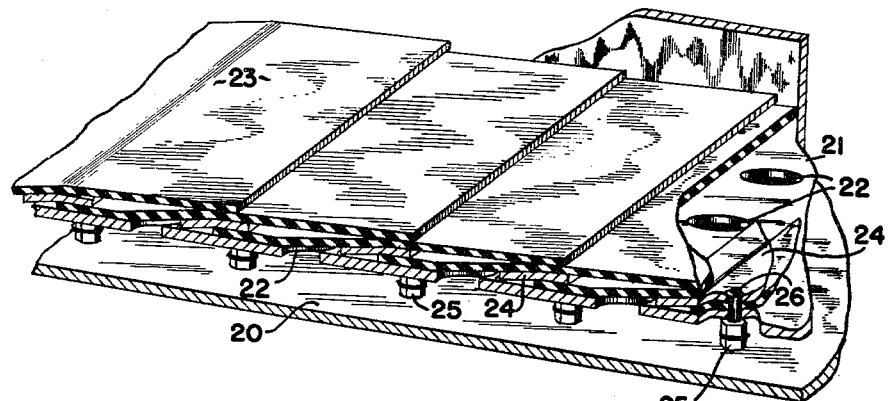
Fig. II
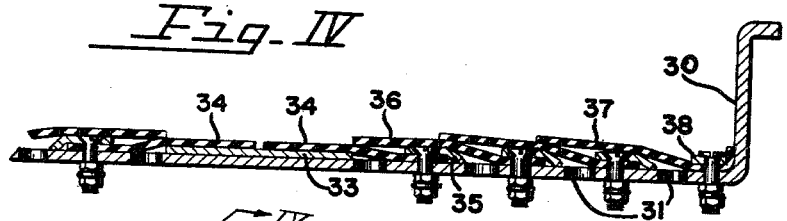
Fig. IV
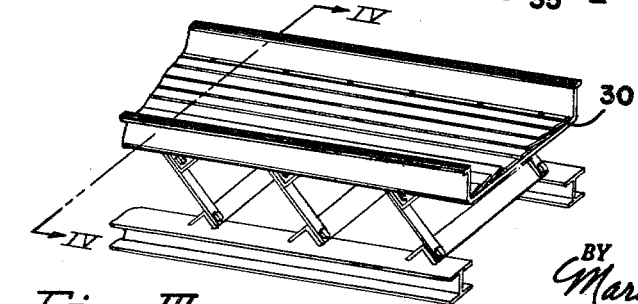
Fig. III
INVENTORS.
JOHN M. MORRIS
ROBLEY W. EVANS
BY Marshall + Wilson
ATTORNEYS July 20, 1965
J. M. MORRIS ETAL
3,195,713
VIBRATORY CONVEYOR WITH SHINGLED DECK
Filed May 24, 1961
4 Sheets-Sheet 2
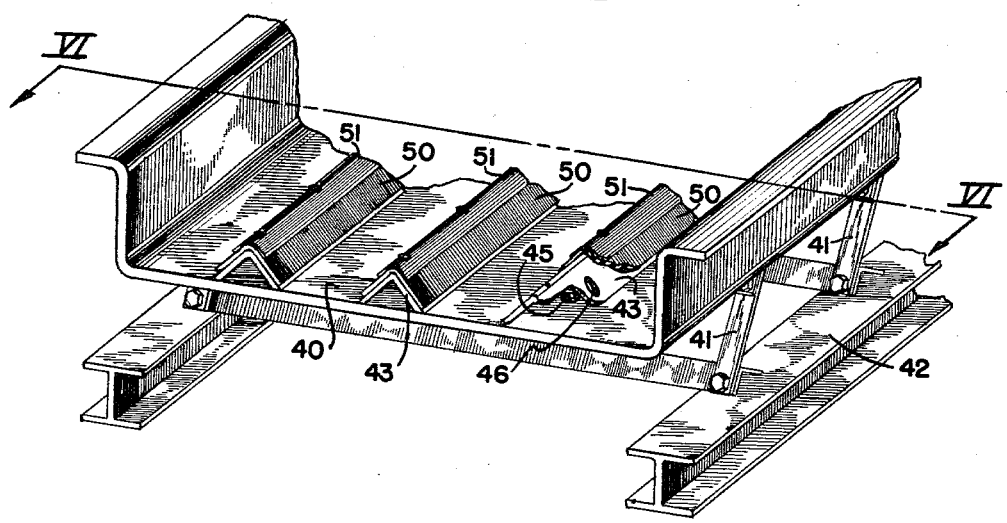
Fig. V
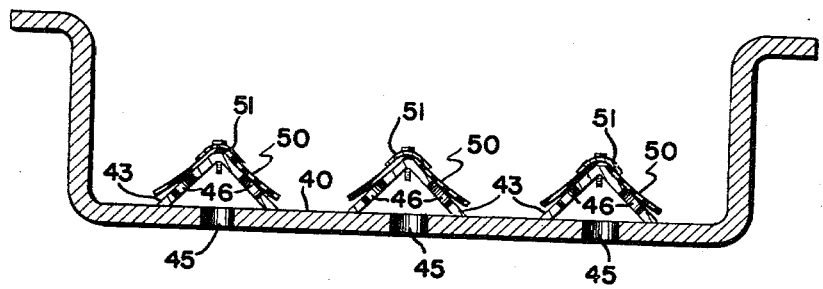
Fig. VI
INVENTORS.
JOHN M. MORRIS
ROBLEY W. EVANS
BY
Marshall & Wilson
ATTORNEYS July 20, 1965
J. M. MORRIS ETAL
3,195,713
VIBRATORY CONVEYOR WITH SHINGLED DECK
Filed May 24, 1961
4 Sheets-Sheet 3
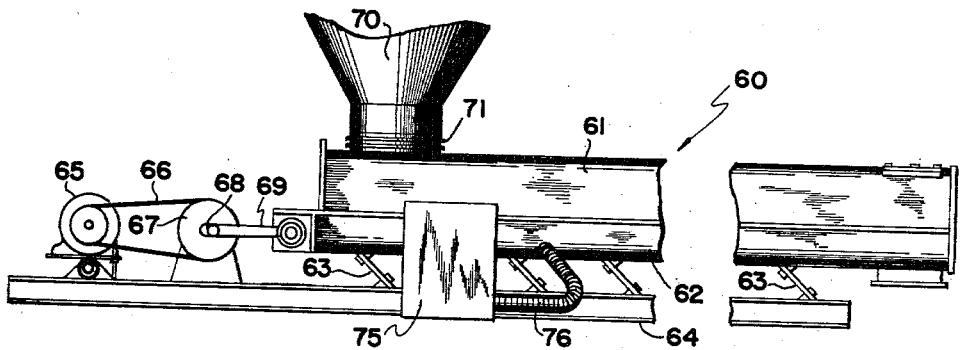
_Fig_ VII
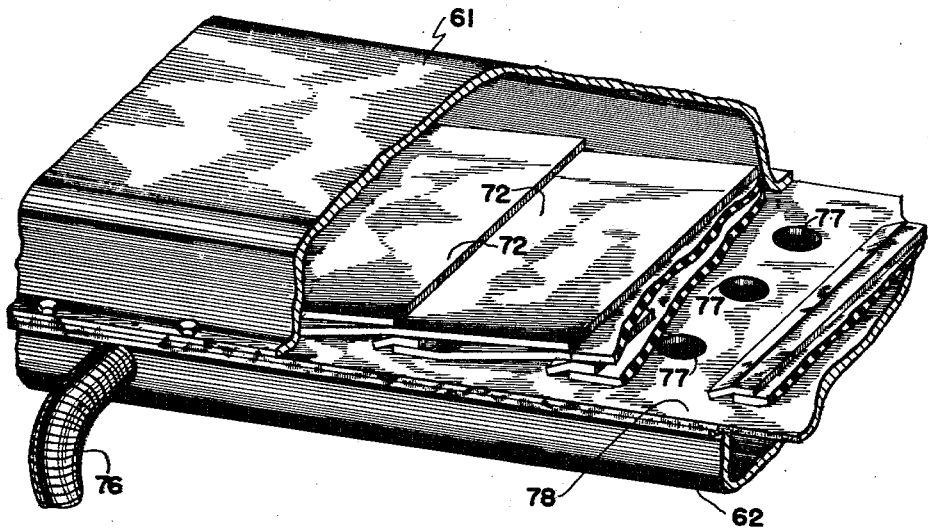
_Fig_ VIII
INVENTORS.
JOHN M. MORRIS
ROBLEY W. EVANS
BY Marshall & Wilcox
ATTORNEYS July 20, 1965
J. M. MORRIS ETAL
3,195,713
VIBRATORY CONVEYOR WITH SHINGLED DECK
Filed May 24, 1961
4 Sheets-Sheet 4
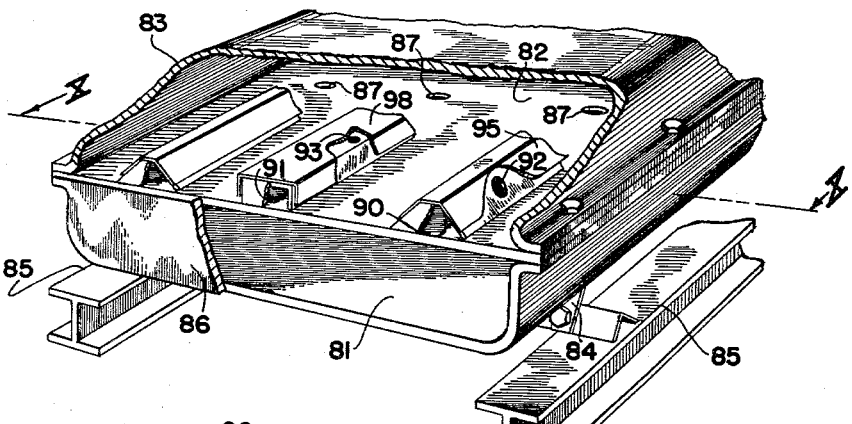
_Fig. IX_
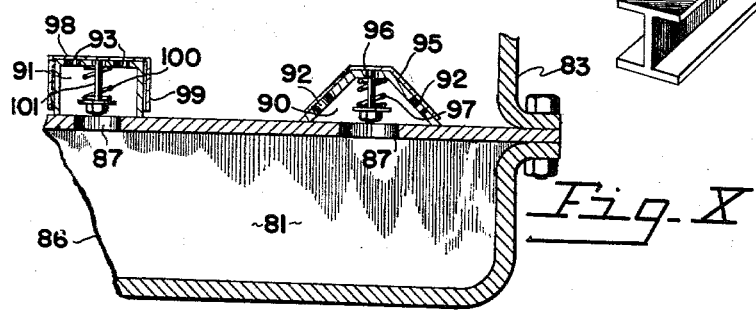
_Fig. X_
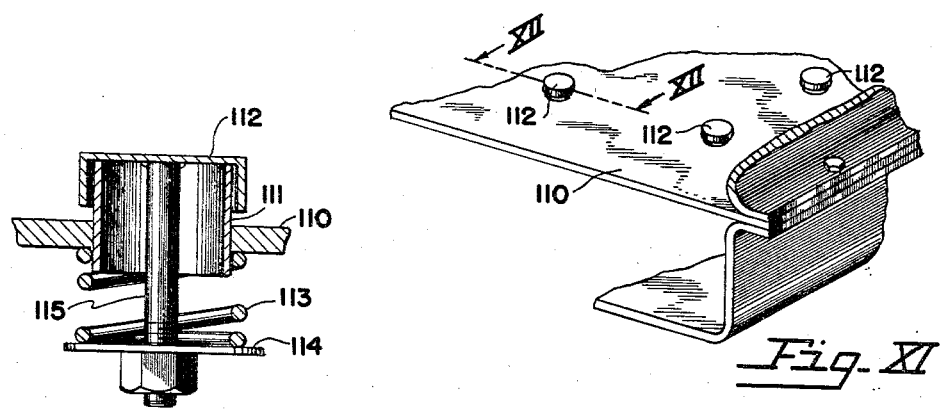
_Fig. XI_
_Fig. XII_
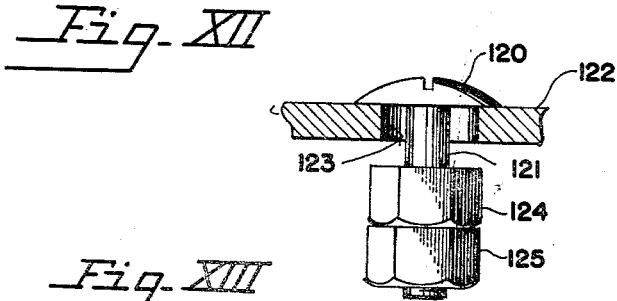
_Fig. XIII_
INVENTORS
JOHN M. MORRIS
ROBLEY W. EVANS
BY Marshall & Wilson
ATTORNEYS United States Patent Office 3,195,713
Patented July 20, 1965

3,195,713
VIBRATORY CONVEYOR WITH SHINGLED DECK
John M. Morris, Louisville, Ky., and Robley W. Evans, New Albany, Ind., assignors to Rex Chainbelt Inc., a corporation of Wisconsin
Filed May 24, 1961, Ser. No. 112,432
1 Claim. (Cl. 198—220)

This invention relates to vibratory conveyors and similar apparatus in which a bed of powdery material is to be vibratorily conveyed or processed and air or other gas admitted into the space between the conveyor deck or container bottom and the material during those portions of the vibratory cycle when the material is thrown free of the deck or container bottom.

Vibratory material receivers, such as conveyors or containers, are employed in many manufacturing processes for conveying material from one location to another or for agitating the material during processing. In a vibratory container the vibration may be along a vertical path while in an ordinary vibratory conveyor the conveying surface is vibrated along an inclined path so that the material thereon is thrown upwardly and forwardly free of the conveyor surface to move forward while the surface itself moves downwardly and backwardly. Near the start of the next forward cycle of the conveyor the material is again caught in its advanced position and again thrown upwardly and forwardly. This method of conveying is satisfactory as long as the material can actually be thrown free of the conveyor surface. When conveying finely divided powdery materials such as Portland cement, flour, or similar materials there is such a limited air flow through the bed of material that it acts as an impervious mass and the air pressure above the material bearing down on the material holds the material in contact with the conveyor deck during the downward and rearward motion thus preventing satisfactory conveying of the material. It is known to supply limited quantities of air into the space immediately above the conveyor deck and below the material to relieve the vacuum during the downward motion of the conveyor stroke. One method involves the use of porous filter decks that allow the air to be continuously admitted and yet are able to retain and carry the powdered materials. These decks tend to clog in use and are difficult to clean when the material to be conveyed is changed from one type to another.

The principal object of this invention is to provide an improved conveyor deck that not only admits air or other conditioning fluid to the space beneath the conveyed material during portions of the conveyor vibratory cycle but also is rugged, not susceptible to clogging, and flexible enough to inhibit the incrustation of material on the conveyor deck.

Another object of the invention is to provide a flexible conveyor deck having portions that are relatively movable in response to the vibration of the conveyor deck to admit air only during certain portions of the cycle of vibration.

A further object of the invention is to provide an improved conveyor deck that includes a large plurality of openings that are covered with flexible members which in response to the vibration of the vibratory conveyor induce a flow of air into the material being conveyed.

More specific objects and advantages are apparent from the following description of a preferred form of the invention.

According to the invention the improved conveyor deck or processing container bottom comprises a rigid perforated vibrating surface and at least one resilient sheet of material attached along one edge to the conveyor deck to overlie the perforations in the deck. Preferably a number of sheets or shingles are employed, each arranged to partially overlie the next downstream sheet.

In a modified form the flexible resilient sheets of material overlie the apertures in the perforated rigid support member but do not overlie each other.

Preferred forms of the invention are illustrated in the accompanying drawings.

In the drawings:

FIG. I is a side elevation illustrating a vibratory conveyor in which the invention may be employed.

FIG. II is a fragmentary vertical section of a portion of the conveyor illustrating the construction of the conveying surface.

FIG. III is a fragmentary pictorial representation of the portion of a modified form of conveyor surface.

FIG. IV is a fragmentary cross sectional view of the conveyor shown in FIG. III as seen from the line IV—IV of FIG. III.

FIG. V is a fragmentary isometric view of the discharge portion of another conveyor showing still another form of the improved conveying surface.

FIG. VI is a cross sectional view of the conveyor shown in FIG. V as seen from the lines VI—VI of FIG. V.

FIGS. VII and VIII are side and fragmentary isometric views of a vibratory conveyor showing means for positively supplying air or other gas to the space beneath the shingles.

FIG. IX is a fragmentary isometric view, with parts broken away, of the discharge end of a vibratory conveyor showing still another form of vibration actuated valves for admitting air or other gas to the space beneath a powdery material carried in a vibratory conveyor.

FIG. X is a fragmentary cross section taken substantially along the line X—X of FIG. IX showing the vibration actuated valves in detail.

FIG. XI is a fragmentary isometric view of a portion of a conveyor and plenum chamber showing still another form of valve suitable for use for admitting air or gas to the space beneath powdery material on the conveyor deck.

FIG. XII is a cross section at an enlarged scale, of the valve shown in FIG. XI as seen from the line XII—XII of FIG. XI.

FIG. XIII is a side elevation of still another form of valve suitable for use in the improved conveyor arrangement.

These specific figures and the accompanying description are intended merely to illustrate the invention and not to impose limitations on its scope.

In order that a vibratory conveyor may efficiently convey materials it is necessary that the frictional contact between the bed of the conveyor and the material be quite firm during the forward and upward stroke of the conveyor and be substantially reduced or eliminated during the entire rearward and downward stroke of the conveyor. Thus material is thrown forward a distance substantially equal to twice the stroke of the conveyor during each vibratory cycle. If the stroke of the conveyor is insufficient to throw the material free of the conveyor during the greater portion of the return stroke the speed of conveying is reduced. In fact, the stroke may be reduced to the point where the material does not convey at all. When fine powdery materials such as Portland cement, flour, talc, etc. are being conveyed the lack of free air circulation through the material tends to draw a vacuum in the bottom strata of the powdery material during the downward and rearward stroke of the conveyor. The downward air pressure acting on the bed of material during the start of such downward stroke accelerates the bed of powdery material downwardly quite rapidly at the start of the rearward stroke so that the material follows the conveyor deck and is in good frictional contact therewith during a major portion of the rearward stroke. This prevents efficient conveying of the material. This effect can be minimized or eliminated by admitting air directly into the space between the powdery material and the conveyor deck during the return stroke of the conveyor. According to the invention this air is admitted through ventilating holes in the conveyor deck which ventilating holes are covered with flap valves that open during the initial downward stroke of the conveyor and that close prior to the start of the upward stroke. The flapping of these valves provides a pumping action that induces air through the ventilating openings and discharges it up through the powdery material on the conveyor deck. The quantity of air pumped in this manner is considerably less than that required to fluidize the material.

A vibratory conveyor operating according to these principles is illustrated in the drawings and comprises a trough 1 that may be provided, if desired, with a cover 2. The material to be conveyed is introduced through a chute 3 having a flexible connector 4 to prevent the loss of material or dust into the atmosphere. The trough 1 is preferably supported on a plurality of inclined cantilever springs 5 so that it vibrates along an inclined path in the direction of an arrow 6 in response to forces transmitted from a motor driven eccentric shaft 7 through a connecting rod 8. The shaft 7 is preferably driven by an electric motor 9 by means of a belt 10 that is trained over a variable pitch pulley 11 on the motor armature shaft and a fixed diameter pulley 12 on the shaft of the eccentric 7. The assembly of conveyor and drive is mounted on a base 13 which may be either anchored to a foundation or the building floor or the base may be made of heavy material and mounted on vibration isolators.

The inclination of the cantilever springs 5 may be varied from a position nearly vertical through a position approximating a 45° angle or slope as indicated to a horizontal position when supporting a container. An angle of inclination of approximately 30° from the vertical is commonly employed in vibratory conveyors.

A bed or bottom 20 of the conveyor trough 1 may include a plenum chamber 20, as shown in FIG. II, if it is desired to supply conditioned air to the material on the conveyor. In the event that atmospheric air is satisfactory a perforated plate 21, shown as the top of the plenum chamber 20, may serve as the bottom of the conveyor trough 1. The plate 21 is provided with a plurality of perforations 22 serving as ventilating apertures or ports to admit air or other conditioning fluid from the atmosphere or from the plenum chamber between the bottom 20 and plate 21 into the conveyor during the operation of the conveyor.

The ventilating apertures or perforations 22 are preferably arranged in rows extending across the full width of the plate 21. These rows of holes 22 are repeated at intervals along the length of the conveyor. In an actual conveyor having a width approximately two to three feet the ventilating ports 22 were arranged in rows spaced approximately 10 inches apart along the length of the conveyor.

To prevent the escape of conveyed material through the ventilating openings these openings are covered with flap valves in the form of shingles 23 made of rubber or other flexible impervious material. Each of the shingles 23 is clamped to the perforated conveyor deck plate 21 by a clamp bar 24 that overlies the upstream end of the shingle and is drawn or locked in position by nuts and bolts 25, 26 extending through the bar, the edge or margin of the shingle 23 and the plate 21. The shingles 23 are each of sufficient width to extend from the clamp bar 24 across the first series of apertures 22, the clamp bar of the next downstream shingle and across that shingle to a point approximately above the clamp bar of the second downstream shingle.

This arrangement of flexible shingles overlying perforations or apertures of a base plate for a conveyor offers a number of advantages each of which is individually conducive to improved performance of the conveyor. The flexing of the shingles in response to the vibration of the conveyor prevents the build up or accumulation of material on any portion of the conveyor deck, a trouble which is often experienced when slightly tacky materials are conveyed in an ordinary vibratory conveyor. The flexing of the shingles and particularly the movements of the free ends of the shingles approximates the vertical movement of a load being conveyed so that those portions of the shingles that contact the powdery material being conveyed are thrown upwardly away from the conveyor deck or perforated plate at the same time that the material is thrown upwardly and then the shingles are pulled backwardly under the material and down as the conveyor executes its backward and downward stroke. Since the shingles, particularly the free ends, tend to execute the same motion as the material being conveyed, there is a substantially reduced tendency for a vacuum to be produced below the powdery material and above the deck. At the same time the pressure of the powdery material on the shingles is reduced so that the shingles may be easily slid under the material. The third effect is that the upward movement of the shingles relative to the deck at the end of the upward and forward stroke of the conveyor causes air to be drawn in through the apertures or perforations 22 into the space between the shingles. Then at the start of the downward stroke when the upstream end of each shingle is pulled downwardly because of its attachment to the conveyor a wave-like motion proceeds along the length of the shingle thus pumping the indrawn air across the face of the lower shingle and out through the space between the now raised flap of each shingle and the next lower shingle and into the space between the shingles and the material being conveyed. As the shingles fall back in place at the end of the downward stroke of the conveyor or start of the next upward stroke the air that has passed beneath the shingles is trapped below the material and then feeds upwardly slowly through the powdery material thus keeping it slightly aerated and promoting free-flowing of the material in response to the vibratory action. These effects are all present whether the plate 21 is the actual bottom of the conveyor trough 1 or whether it is a false bottom above a plenum or air chamber enclosed between the bottom plate 20 of the conveyor and the plate 21. If the plenum chamber is formed air must of course be admitted to it and such air may be heated, cooled, dried, or otherwise conditioned as may be required for the treatment of the material being conveyed.

While a crosswise orientation of the shingles with respect to the conveyor trough is preferred, the shingles may be arranged longitudinally of the conveyor as illustrated in FIGS. III and IV. This arrangement also provides all of the advantages of the flexible shingles and perforated conveyor bed. In the longitudinal arrangement, as shown in FIGS. III and IV, a conveyor trough bottom 30 has perforations 31 that preferably are spaced at intervals of five to ten inches crosswise and lengthwise of the conveyor. To secure an approximately smooth bottom for the powdery material being conveyed the conveyor bottom 30 is provided with a longitudinally extending center plate 33 and the adjacent shingles 34 are arranged to partially overlie such center plate. The shingles 34 are attached and secured by clamping bars 35 that are in turn covered by the next adjacent shingles 36. This arrangement is continued to the edge of the conveyor adjacent its side wall where the last shingle 37 is clamped by a bar 38 with the outside margin of the shingle 37 turned up against the side wall of the trough.

In this arrangement as in the first the incoming air feeding through or being pumped through between the longitudinally extending shingles by the vibratory action of the conveyor combined with the flapping motion of the shingles in response to the vibration keeps the edges of the shingles clear of materials so that the material does not sift back through the apertures 31.

Still another arrangement of shingles or flat valves for controlling the air inlet into the bottom of a mass of powdery material carried on a vibratory conveyor or in a vibratory container is illustrated in FIGS. V and VI. In this arrangement a conveyor trough 40 that is carried on inclined springs 41 from a base 42 is provided with longitudinally extending inverted angle irons 43 that are welded to the bottom of the conveyor trough 40 to form longitudinally extending ducts. The trough 40 has perforations 45 arranged at intervals along the longitudinally extending ducts formed by the angle irons 43 to ventilate the space within such ducts. Furthermore, the sides of the angle irons are perforated to provide apertures 46 spaced at regular intervals along the lengths of the angle irons. Longitudinally extending flexible flap valves 50 made of rubber or similar elastic flexible material are attached at or near the apex of the angle irons 43 as by means of U-shaped clamping bars 51 so that the flap valves 50 extend down over the sides of the angle irons to cover the apertures 46. While the flap valves 50 normally lie in close contact with the surfaces of the angle irons 43 they are deflected to the positions shown in FIG. VI by the downward and rearward acceleration of the deck during that portion of the vibratory cycle so that as the material being conveyed tends to be thrown upwardly and forwardly the valves open to admit air into the space beneath the material and above the conveyor deck 40 thus relieving any tendency for the material to be prematurely drawn back into contact with the conveyor. At the start of the next upward and forward cycle of the vibratory motion the flap valves 50 resume their normal position sealing off the apertures 46 and preventing any ingress of conveyed material into the space beneath the angle irons 43.

This latter arrangement of angle irons and flat valves is also suitable for vibratory reactor containers in which the material instead of being conveyed is merely agitated while air or other treating medium is introduced through the apertures in the bottom of the container and caused to flow upwardly through the material being treated.

The improved conveyor surface including the flap valves, by minimizing or eliminating the low pressure or vacuum tending to be created beneath the powdery material during the downward stroke of the conveyor, makes it possible to convey fine powdery material with a speed and efficiency generally equal to that attained when conveying coarse granular materials.

In the arrangement shown in FIG. VII, which is the same as FIG. I except for the addition of means for positively supplying air or other aeriform treating fluid to the material being conveyed, a conveyor 60 comprises a shingled conveyor deck enclosed within a cover 61 and carried on a U-shaped plenum chamber 62. The plenum chamber 62 or a framework surrounding and supporting the plenum chamber is carried on inclined cantilever springs 63 connected between the frame or plenum chamber 62 and a base 64. The conveyor 60 is given a vibratory motion along an inclined path determined by the slope of the cantilever springs 63 by a vibratory drive comprising a motor 65 that is connected through belt 66 and pulley 67 to an eccentric shaft 68. The eccentric shaft 68 is connected through a connecting rod 69 to the upstream end of the conveyor 60.

Material to be conveyed is supplied through a chute 70 connected through a flexible boot or sleeve 71 to the cover 61 at the upstream end of the conveyor. As illustrated in FIG. VIII the material that is dropped through the chute 70 and sleeve 71 into the conveyor 60 is carried along on a series of flexible shingles 72, the conveying action being produced by the vibration of the conveyor 60 which is transmitted through the shingles 72.

In the previous examples the action of the flexible shingles in response to the vibration of the conveyor provides a pumping action tending to draw air through the apertures in the conveyor deck and expel that air into the space between the upper surfaces of the shingles and the material being conveyed. In the apparatus shown in FIGS. VII and VIII a blower 75 which may include means for heating or cooling the air or other gas being employed is connected to a flexible duct 76 leading into the plenum chamber 62. The air or other gas thus forced into the plenum chamber 62 feeds upwardly through apertures 77 in a deck 78 of the conveyor 60 and then feeds through the spaces between the shingles 72 as the downstream end of each of the shingles separates from its next downstream neighbor in response to the vibration of the conveyor.

For good conveying action it is desirable that the pressure maintained in the plenum chamber 62 by the blower 75 be slightly less than that required to separate the shingles. If the pressure is so limited the air or other gaseous fluid flows out between the shingles while the conveyor is executing its rearward and downward stroke and tends to blow the powdery material downstream of the conveyor. Pressures higher than the pressure required to just lift the shingles may be employed if localized high velocity air flow through the bed of material being conveyed may be tolerated. With the higher pressures it is difficult to maintain a uniform distribution of gas flow between the various shingles. Because of the natural variation between shingles some will lift before others and the gas flow will tend to concentrate through the resulting openings. Partial correction of this unequal flow condition is obtained because the vibratory action which mechanically opens the spaces between the stiffer shingles periodically during each cycle of vibration.

Since flexible materials capable of tolerating a wide range of temperatures, such as silicone rubber or synthetic rubber materials are currently available and since these materials are inert to most gaseous mediums that might be used for treating the material being conveyed this arrangement employing the blower 75 to maintain a given pressure in the plenum chamber 62 may be employed for heating or cooling powdery material and take advantage of the very high heat transfer rates that are obtainable in a vibrated partially fluidized mass of powdery material.

If the temperature of the powdery material that is being handled is higher than the temperature that can be tolerated by the flexible material, such as silicone rubbers or other synthetic rubbers, metallic valves may be substituted. In the arrangements shown in FIGS. IX to XIII inclusive various forms of metallic valves are illustrated. Referring first to FIG. IX, the discharge end of a vibratory conveyor, similar to those shown in FIGS. I and VII except that it discharges laterally at the end rather than into a downwardly directed duct, is arranged with a vibratory conveyor deck 80 that forms a partition between a plenum chamber 81 and a material conveying duct 82. The duct 82 is enclosed by a cover 83 arranged to confine the dust from the powdery material. The plenum chamber either by itself or with a frame, is supported from inclined cantilever springs 84 arranged between a base 85 and the bottom of the plenum chamber 81. As illustrated in FIG. IX a plate 86 closes the end of the plenum chamber 81.

A plurality of apertures 87 are cut through the conveyor bed 80. These apertures open into longitudinally extending ducts 90 and 91 formed of inverted angle irons or channels that are welded or otherwise secured to the deck 80. The angle or channel irons are further provided with apertures 92 or 93, respectively, through which air or other gaseous material may flow from the plenum chamber to the space beneath the material in the conveying chamber 82. The holes or apertures 92 are covered with a sheet metal flap valve 95 formed to fit the angle iron forming the duct 90 and held in place by downwardly directed studs 96 and compression springs 97. In this arrangement when the conveyor executes its vibratory motion the sheet metal flap valve 95 is thrown free of the angle iron while the conveyor is executing its downward and rearward stroke so as to admit air through the apertures 92 into the space beneath the powdery material. When the conveyor completes its downward rearward stroke and starts back up to meet and convey the material the flap valve 95 drops back in place covering the apertures 92 and shutting off any reverse flow of air or other gas. Thus this metallic flap 95 serves the same purpose as the shingles 72 shown in FIG. VIII.

In the arrangement shown near the center of FIG. IX and at the left in the cross sectional view, FIG. X, the duct above the conveyor deck 80 is formed by a channel iron, rather than an angle iron, with openings 93 cut through the web of the channel. A flap valve 98 in this case is also channel shaped but enough wider to provide clearance space between the depending wall 99 of the flap valve 98 and the adjacent wall of the channel iron. This clearance is necessary to allow air or gas passing through the openings 93 to escape past the lower edge of the depending flange 99. In this arrangement, as in the other, the flap valve is urged downwardly into sealing position by helical compression springs 100 that are sleeved over downwardly directed studs 101 fastened to the flap valve 98. The springs 100 must be weak enough to allow the flap valve to lift in response to the vibratory force.

In the arrangement shown in FIGS. XI and XII, a conveyor deck 110 is provided with apertures in each of which a short sleeve 111 is fitted to provide an upstanding wall around the edge of the aperture. Cup-shaped caps 112 that loosely fit over the tops of the sleeves 111 serve as valves which are actuated by the vibration of the conveyor deck to admit air during certain portions of the vibratory cycle. The cup-shaped valves 112 are urged downwardly by helical compression springs 113 lightly compressed between the undersurface of the conveyor deck 110 and washers 114 held on the lower ends of studs 115 that are attached to and directed downwardly from the center of the cup-shaped valves 112.

Still another form of value is illustrated in FIG. XIII. As shown in this figure the movable portion of the valve comprises an oval head 120 of a short bolt 121 that rests on a conveyor deck 122 with the stem of the bolt 121 extending through an aperture 123 of the deck. Jam nuts 124 and 125 are threaded onto the bolt and locked against each other to hold the nuts in position. The nuts are located on the stem of the bolt a sufficient distance below the conveyor deck 122 so that the bolt may vibrate in response to the vibration of the deck to cylically lift the head 120 from the deck 122 to allow air to flow through the aperture 123.

These various forms of metallic valves that are actuated by the vibration of the conveyor deck to cyclically open air or gas passages from the atmosphere or a plenum chamber below the deck into the space beneath the powdery material allow extremely hot powdery material to be conveyed efficiently and the degree of cooling effected by the admitted air may be easily regulated. Also, if conveying action alone is desired without cooling, air preheated to the temperature of the powdery material may be employed.

Various modifications may be made in the specific structure of the shingles or various valving arrangements for the conveyor without departing from the spirit and scope of the invention.

We claim:

In a vibratory apparatus, in combination, a material receiver, means for vibrating the receiver along a path having at least a vertical component, said receiver having at least one perforation in its bottom, a rigid member overlying said perforation and forming an elongated chamber above the conveyor bottom, said member having at least one row of perforations, and a second member resiliently connected to the first member and adapted to be resiliently urged against the first member to close said perforations during those portions of the vibratory cycle of the receiver when the downward acceleration is substantially less than the acceleration of gravity whereby said perforations are closed at all times a material is in contact with said bottom and are opened during a portion of the time that the material is tossed free of the receiver bottom.

References Cited by the Examiner
UNITED STATES PATENTS
2,750,681  6/56  Berry ------------------ 34—164

SAMUEL F. COLEMAN, Primary Examiner.

SAMUEL LEVINE, EDWARD S. SROKA, ERNEST A. FALLER, Jr., Examiners.